United States Patent
Shaikh et al.

(10) Patent No.: US 10,225,708 B2
(45) Date of Patent: Mar. 5, 2019

(54) TRUST EVALUATION WIRELESS NETWORK FOR ROUTING DATA PACKETS

(71) Applicant: King Abdulaziz University, Jeddah (SA)

(72) Inventors: Riaz Ahmed Shaikh, Jeddah (SA); Vijey Thayananthan, Jeddah (SA)

(73) Assignee: King Abdulaziz University, Jeddah (SA)

(*) Notice: Subject to any disclaimer, the term of this patent is extended or adjusted under 35 U.S.C. 154(b) by 269 days.

(21) Appl. No.: 15/134,912

(22) Filed: Apr. 21, 2016

(65) Prior Publication Data

US 2017/0195826 A1 Jul. 6, 2017

Related U.S. Application Data (60) Provisional application No. 62/275,661, filed on Jan. 6, 2016.

(51) Int. Cl.
| | |
|---|---|
| *H04W 4/38* | (2018.01) |
| *H04L 29/06* | (2006.01) |
| *H04W 12/10* | (2009.01) |
| *H04W 40/02* | (2009.01) |

(52) U.S. Cl.
CPC ............ *H04W 4/38* (2018.02); *H04L 63/105* (2013.01); *H04W 12/10* (2013.01); *H04W 40/02* (2013.01)

(58) Field of Classification Search
CPC ........ H04W 4/38; H04B 17/318; H04B 1/713
See application file for complete search history.

(56) References Cited

U.S. PATENT DOCUMENTS

| | | | | |
|---|---|---|---|---|
| 5,455,865 A | * | 10/1995 | Perlman | H04L 29/06 370/389 |
| 2007/0129020 A1 | * | 6/2007 | Anton-Becker | H04B 7/082 455/78 |
| 2008/0244739 A1 | | 10/2008 | Liu et al. | |

(Continued)

OTHER PUBLICATIONS

Shaikh et al, "INtrusion-aware trust model for vehicular ad hoc networks", Aug. 2013, Security and Communication networks Security Comm. Netowrks 2014, pp. 1652-1669.*

(Continued)

*Primary Examiner* — Siming Liu
(74) *Attorney, Agent, or Firm* — Oblon, McClelland, Maier & Neustadt, L.L.P.

(57) ABSTRACT

A hop-by-hop trust evaluation scheme (H-TEA) is disclosed that can be used to route a data packet between a set of network nodes in an identity anonymous wireless sensor network. The H-TEA scheme is a complete localized approach for each network node to determine a trustworthiness reputation of the data packet for routing without requiring a recommendation from another node or any historical information about the other node. In the H-TEA scheme, the trustworthiness reputation of the packet is evaluated based on one or more of four verification processes: a data quality verification process, a location verification process, a time verification process, and a travel direction verification process. The H-TEA scheme can be implemented to preform network data management and network data security in a wireless sensor network with a resource constraint and requires anonymity.

20 Claims, 10 Drawing Sheets

(56) References Cited

U.S. PATENT DOCUMENTS

2011/0078775 A1 3/2011 Yan
2012/0276847 A1 11/2012 Peterson

OTHER PUBLICATIONS

Shaikh et al, "Hop-by-hop trust evaluation algorithm for identity anonymous sensor networks", IETE Journal of Research, vol. 61, No. 2, online publish Jan. 2015.*
Riaz Ahmed Shaikh, et al., "Hop-by-hop trust evaluation algorithm for identity anonymous sensor networks", IETE Journal of Research, vol. 61, No. 2, Mar.-Apr. 2015, pp. 154-159.
Yan Lindsay Sun, et al., "Trusted Cooperative Transmissions: Turning a Security Weakness into a Security Enhancement", Securing Wireless Communications at the Physical Layer, Chapter 15, 2010, pp. 355-377.
Zhen Huang, "On Reputation and Data-centric Misbehavior Detection Mechanisms for VANET", Library and Archives Canada ETDs Repository, 2011, 108 pages.
Garth V. Crosby, et al., "Location-aware, Trust-based Detection and Isolation of Compromised Nodes in Wireless Sensor Networks", International Journal of Network Security, vol. 12, No. 2, Mar. 2011, pp. 107-117.
Satyajayant Misra, et al., "Efficient anonymity schemes for clustered wireless sensor networks", Int. J. Sensor Netvvorks, vol. 1, No. 1, 2006, pp. 50-63.
Hossein Jadidoleslamy, "TMS-HCW: a trust management system in hierarchical clustered wireless sensor networks", Security and Communication Networks, 2015, 13 pages.
Ke Liu, et al., "Location verification and trust management for resilient geographic routing", Journal of Parallel and Distributed Computing, vol. 67, 2007, pp. 215-228.
Riaz Ahmed Shaikh, et al., "Intrusion-aware trust model for vehicular ad hoc networks", Security and Communication Networks, vol. 7, 2014, pp. 1652-1669.

* cited by examiner

FIG. 2A  Algorithm 200' : H-TEA Scheme

TRUST EVALUATION WIRELESS NETWORK FOR ROUTING DATA PACKETS

CROSS REFERENCES TO RELATED APPLICATIONS

This application claims the benefit of U.S. Provisional Application 62/275,661, filed Jan. 6, 2016, which is incorporated herein by reference in its entirety.

SUMMARY

A hop-by-hop trust evaluation scheme (H-TEA) is disclosed that can be used to route a data packet between a set of network nodes in a network such as an identity anonymous wireless sensor network. The H-TEA scheme is a complete localized approach for each network node to determine a trustworthiness reputation of the data packet for routing without requiring a recommendation from another node or any historical information about the other node. In the H-TEA scheme, the trustworthiness reputation of the packet is evaluated based on one or more of four verification processes: a data quality verification process, a location verification process, a time verification process, and a travel direction verification process. The H-TEA scheme can be implemented to preform network data management and network data security in a wireless sensor network with a resource constraint and requires anonymity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

A wireless sensor network (WSN) includes a plurality of network nodes (nodes) distributed over a geographic area for transmitting and receiving a data packet (packet) between two or more communicating parties. Each node can have a base station that is a final destination for the packet. Each node can be an intermediate node that can be used for routing the packet within the WSN. The WSN can use a network routing protocol to route the packet to a next node toward the final destination. The network routing protocol can route the packet based on a trustworthiness reputation (trustworthiness) of a node. Each node can be classified as one of a trusted node, a malicious node, a selfish node, and a faulty node. An example of a malicious node is a node that provides a false location or a false time. The network routing protocol can be based on an assumption that each node has a node identity that identifies the node.

An identity anonymous wireless sensor network (IAWSN) is a WSN that uses an anonymity of each node to prevent an adversary from knowing an identity of a communicating party by reading a content of a packet that is intercepted. In order to achieve anonymity, a temporal pseudonym can be used instead of a revealing identity for each node. However, a temporal pseudonym is not useful in building the trustworthiness of the node. Evaluating the trustworthiness reputation in an IAWSN within a resource-constraint environment is an open problem.

The WSN can rely on a trustworthiness reputation that is provided or hosted by a centralized node or a centralized server that can be adjusted based on a set of local information available at each node. The centralized node approach is designed to rely on a trust model based on a recommendation of another node and a historical information about the other node that can influence the trustworthiness reputation. Implementing the centralized node approach increases a resource required such as a memory usage, a communication overhead, and a computation overhead of the network.

A hop-by-hop trust evaluation scheme (H-TEA) is disclosed that can be used by a network routing protocol in an IAWSN to determine a trustworthiness reputation of a packet. The H-TEA scheme is a complete localized approach and does not require a recommendation from another node or any historical information about the other node. This makes the H-TEA scheme lightweight in terms of the resource required such as the memory usage, the communication overhead and the computation overhead. The H-TEA scheme is highly suitable to be implemented in a WSN with a resource constraint.

In the H-TEA scheme, a node that receives a packet will first evaluate a trustworthiness of the packet. When the packet is found to be trustworthy, the packet will be forwarded to a next node or to an upper layer of the network. Each node does not need to know a node identity of another node.

In the H-TEA scheme, the trustworthiness of the packet is evaluated based on one or more of four verification processes: a data quality verification process, a location verification process, a time verification process, and a travel direction verification process. These four verification processes do not require a node identity of another node.

A malicious node can insert a false location in a packet. Thus, in one example the trustworthiness of a packet can be determined using a location verification process (Lv). A malicious node can also include a false sending time in the packet. Thus, in one example the trustworthiness of a packet can be determined using a time verification process (Tv). A malicious node can change a route or path of the packet or perform a wormhole attack by creating a channel to another part of the network. Thus, a travel direction verification process (Dv) can be used to provide protection from such attacks.

In an aspect, the H-TEA scheme can reduce a communication overhead in the network and an energy consumption by each node. The H-TEA scheme may be preferably used in a network that prioritizes a non-time-critical application. The H-TEA scheme can be integrated and used with various geographic based routing protocols, such as GeRaF.

Referring now to the drawings, wherein like reference numerals designate identical or corresponding parts throughout the several views.

Figure 1A:
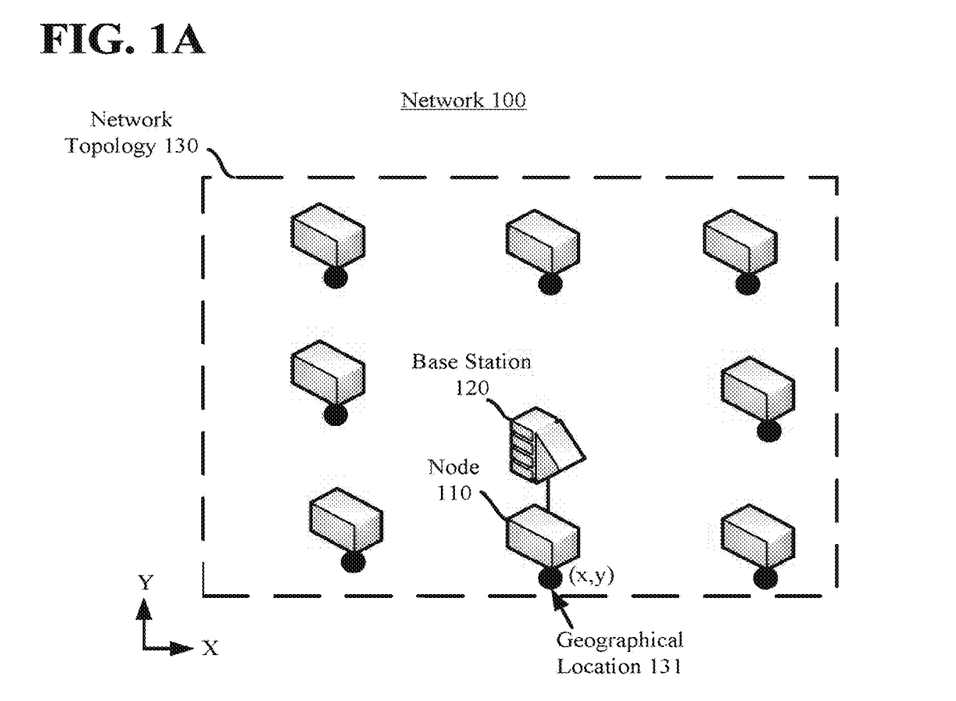
FIG. 1A is a diagram of a network including a network topology having a plurality of nodes according to an example.

FIG. 1A shows a network 100 including a network topology 130 having a plurality of nodes 110 distributed over a geographic area, according to one example. Each node 110 can have a base station 120 and a geographical location 131. According to one example, the network topology 130 is a mapping of each node 110 and each base station 120 over the geographic area described by Cartesian coordinates. The network topology 130 can have any network shape such as a mesh network topology, a star network topology, a common bus network topology, a ring network topology, a fully connected network topology or any other network topology shape.

In one example, each node 110 can have a number of channels. The network 100 can be configured to use a clock synchronization protocol and each node 110 can include a clock to be used for the clock synchronization protocol.

Figure 1B:
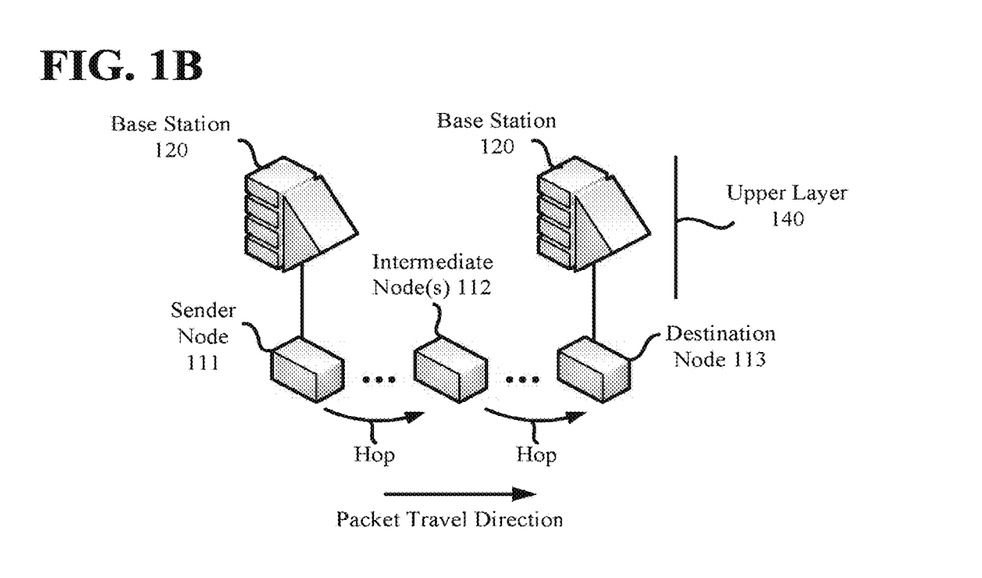
FIG. 1B is a diagram showing a relationship between a set of nodes and a set of base stations according to an example.

FIG. 1B shows a relationship between a set of nodes 110 and a set of base stations 120 according to one example. Each node 110 forwards a packet to another node 110 or to a base station 120. In one example, when a node 110 sends a packet the node 110 is considered a sender node 111 and when a node 110 receives a packet the node 110 is considered a receiver node. The receiver node can also be a destination node 113 or an intermediate node 112. In an example, the receiver node is considered the destination node 113 when the receiver node is associated with a base station 120 that reflects a final destination for the packet. In one example, the receiver node is considered the intermediate node 112 when the receiver node is any other node 110 other than the sender node 111 and the destination node 113.

A hop is considered an act of transmitting a wireless signal for forwarding the packet between the sender node 111 and the receiving node. The receiver node associates a receiving time (Tr) which is a timestamp reflecting when the packet arrived. Each packet can be transmitted and received by a wireless signal. The wireless signal can have a set of attributes such as one or more of a signal quality, a signal energy, a signal strength, a bit error rate (BER), and a signal-to-noise ratio (SNR). In one example, the receiver node can detect a received signal strength (RSS) of the wireless signal. The RSS can be calculated using a signal detection algorithm such as an interference mitigation, a multiple-input and multiple-output (MIMO) receiver, etc. The RSS can depend on the number of channels and may include factors such as a multipath effect, an interference effect, and a link quality of the wireless signal to the node 110 such as 'weak', 'asymmetric', and 'good'. Further, in all environments, the RSS can decrease with a distance between the sender node 111 and the receiver node. According to an example, the base station 120 is considered as an upper layer 140 of the network 100. According to another example, the network 100 can have one or more additional upper layers 140 where each upper layer 140 is another network having a network topology 130 and a plurality of nodes 110.

In an aspect, the geographical location 131 of each node 110 is known to the node 110. Each node 110 may have a unique node identity or a node identity. In one example, the node identity of a node 110 will not be shared with another node 110 in the network 100. In another example, the node identity of the node 110 will be shared with the receiver node and the base station 120.

In another example, the node identity and the geographical location 131 of the receiver node are known to each node 110 in the network 100. The node identity can be used in a variety of ways. For example, a trust model can use the node identity to maintain a past history information which can be used for building the trustworthiness reputation of another node 110. The network routing protocol uses a node identity for forwarding the packet to the final destination.

Furthermore, each node 110 can have a transmission power and a reception power. In one example, the transmission power and the reception power are fixed and are known for each node 110 in the network 100.

In an aspect, when a node 110 is a sender node 111, a sender location (Ls) is the geographical location 131 of the sender node 111. In an aspect, when a node 110 is a receiver node, a receiver location (Ls) is the geographical location 131 of the receiver node. Each base station 120 can have an associated geographical location 131 and a base station identity. In the H-TEA scheme, each data packet or packet contains data, the sender location (Ls) and a sending time (Ts). The sender location (Ls) and the sending time (Ts) are both updated at each hop.

Figure 1C:
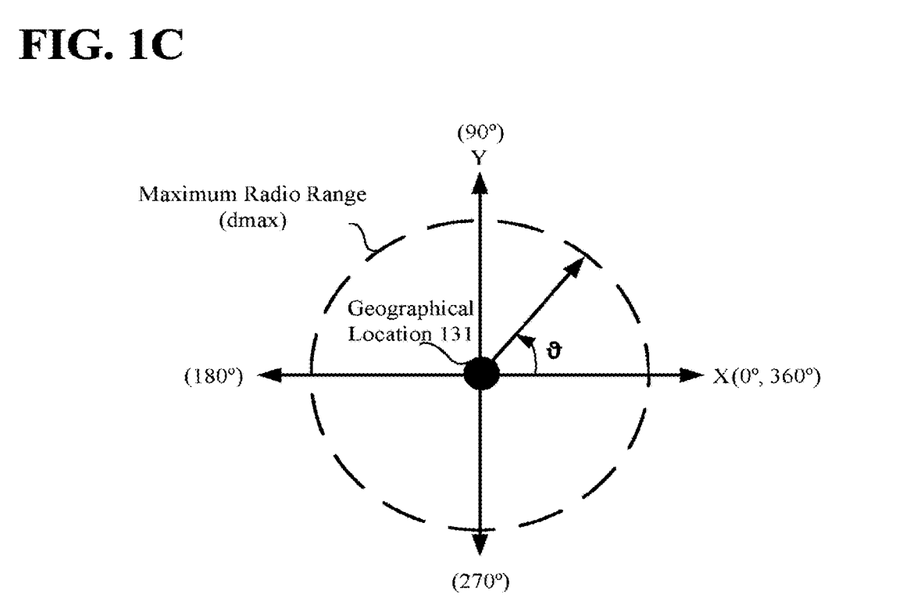
FIG. 1C shows a drawing of a geographical location of a node having a maximum radio range according to an example.

FIG. 1C shows a drawing of the geographical location 131 of a node 110 having a maximum radio range (dmax) according to one example. The maximum radio range (dmax) can reflect a perimeter around the node 110 corresponding with either the transmission power or the reception power of each node 110. In an aspect, the maximum radio range (dmax) can be a symmetrical perimeter or an asymmetrical perimeter around the node 110. The maximum radio range (dmax) can be divided into a plurality of quadrants. In one example, each quadrant has an associated set of Cartesian coordinates that define a set of boundaries. Each quadrant can correspond with an angle of arrival $\theta$. In an aspect, the angle of arrival $\theta$ refers to a direction of detection of the wireless signal that transmitted the packet. In an example, the angle of arrival $\theta$ can be determined using the sender location (Ls) and the geographical location 131. In another example the angle of arrival $\theta$ can be determined by an antenna of the receiver node.

Figure 2A:
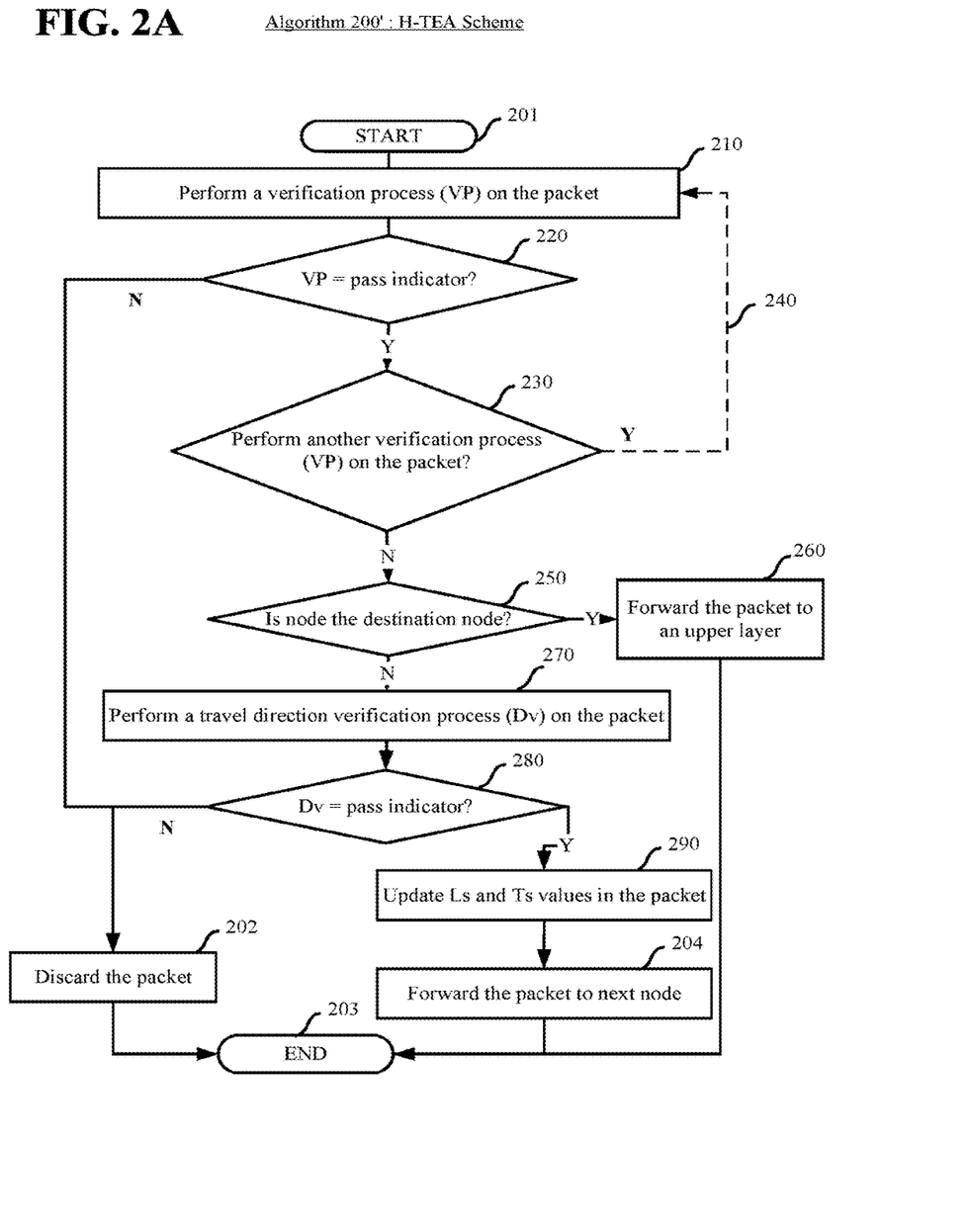
FIG. 2A shows a flowchart of an algorithm to perform a hop-by-hop trust evaluation scheme according to an example.

FIG. 2A shows a flowchart of an algorithm 200' to perform the H-TEA scheme according to an example. The H-TEA scheme classifies each packet as either a trusted packet or an untrusted packet based on a pass indicator and a fail indicator from one or more of the four verification processes. Each of the four verification processes is provided a set of inputs and returns either a pass indicator in a case of a trusted packet or a fail indicator in a case of an untrusted packet. The pass indicator can be a Boolean value in a software code such as "1", a set value or a change in value based on at least one of a voltage, a current, a capacitance, and an impedance in a circuit. The fail indicator can be a Boolean value in a software code such as "0", a set value or a change in value based on at least one of a voltage, a current, a capacitance, and an impedance in a circuit.

The H-TEA scheme determines the trustworthiness of the packet based on one or more of the four verification processes: the data quality verification process (Qv), the location verification process (Lv), the time verification process (Tv), and the travel direction verification process (Dv). In one example, the H-TEA scheme determines the trustworthiness of the packet based on one or more of the four verification processes in a serial sequence. In another example, the H-TEA scheme determines the trustworthiness of the packet based on one or more of the four verification processes in a parallel sequence. In another example, the H-TEA scheme determines the trustworthiness of the packet based on one or more of the four verification processes in combination of a parallel sequence and a serial sequence of the four verification processes. Also, in other examples, one or more of the verification processes may be used to determine the trustworthiness of the packet with one or more other verification processes.

The H-TEA scheme performs the four verification processes for each packet according to a series of steps described by the algorithm 200' according to an example.

At step 201 a sender node 111 sends a packet to a receiver node.

At step 210 a verification process (VP) is performed on the packet by the receiver node. The verification process (VP) can be any one of the data quality verification process (Qv) as described in FIG. 3, the location verification process (Lv) as described in FIG. 4, and the time verification process (Tv) as described in FIG. 5.

At step 220, when the verification process (VP) returns a pass indicator, the algorithm 200' advances to step 230. Conversely, when the verification process (Qv) returns a fail indicator the algorithm 200' advances to step 202 discards the packet and at step 203 ends the H-TEA scheme.

At step 230 a determination is made to perform another verification process (VP) on the packet. When the determination is made to perform another verification process (VP) on the packet (Y), the algorithm 200' advances to step 240 and performs a different verification process (VP) at step 210. When the determination is made not to perform another verification process (VP) on the packet (N), the algorithm 200' advances to step 250.

At step 250, the node identity of the receiver node is compared to the final destination. When the node identity of the receiver node is the final destination the algorithm 200' advances to step 260. Conversely, when the receiver node is not the final destination the algorithm 200' advances to step 270.

At step 260 the packet is treated as a trusted packet and the packet is forwarded to the upper layer 140 of the network 100.

At step 270 the travel direction verification process (Dv) is performed on the packet. An example of an algorithm to perform the travel direction verification process (Dv) is described in FIG. 6.

At step 280, when the travel direction verification process (Dv) returns a pass indicator, the algorithm 200' advances to step 290. Conversely, when the travel direction verification process (Dv) returns a fail indicator the algorithm 200' advances to step 202, the packet is discarded and at step 203 ends the H-TEA scheme.

At step 290, when the travel direction verification process (Dv) determines that the packet is moving towards the final destination of the packet, the receiver node is considered an intermediate node 112. Subsequently, the sender location (Ls) and the sending time (Ts) are updated in the packet and the packet is forwarded to a next node and the process is repeated. Conversely, when the travel direction verification process (Dv) determines that the packet is moving away from the final destination the travel direction verification process (Dv) will return a fail indicator. Subsequently, at step 202 the packet is discarded and at step 203 the H-TEA scheme ends.

Figure 2B:
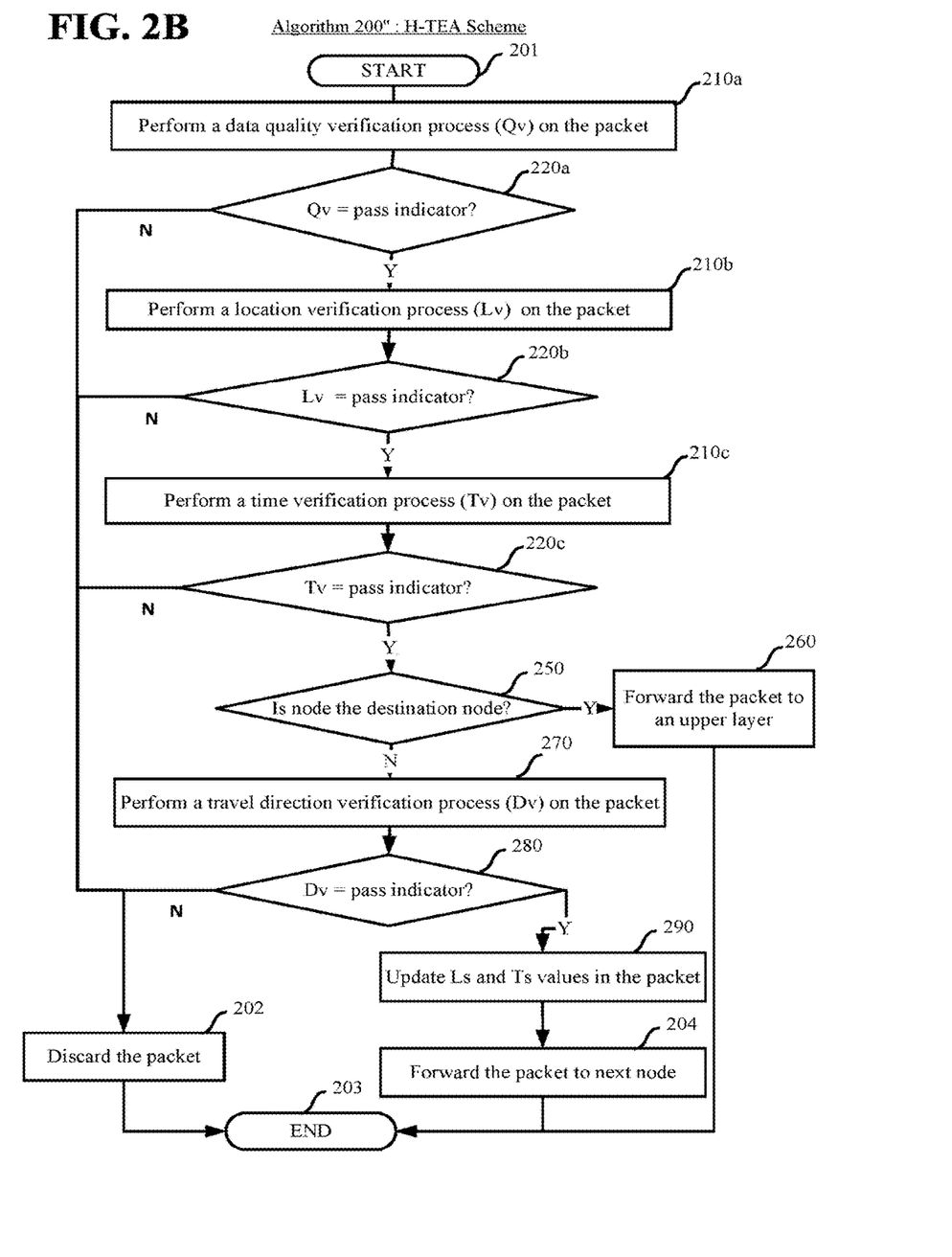
FIG. 2B shows a flowchart of an algorithm to perform a hop-by-hop trust evaluation scheme according to another example.

FIG. 2B shows a flowchart of an algorithm 200" to perform the H-TEA scheme according to another example. The H-TEA scheme performs the four verification processes for each packet according to a series of steps described by the algorithm 200" according to an example.

At step 210 the data quality verification process (Qv) is performed on the packet by the receiver node. An example of an algorithm to perform the data quality verification process (Qv) is described in FIG. 3.

At step 220a, when the data quality verification process (Qv) returns a pass indicator, the algorithm 200" advances to step 210b. Conversely, when the data quality verification process (Qv) returns a fail indicator the algorithm 200" advances to step 202 discards the packet and at step 203 ends the H-TEA scheme.

At step 210b the location verification process (Lv) is performed on the packet. An example of an algorithm to perform the location verification process (Lv) is described in FIG. 4. At step 220b when the location verification process (Lv) returns a pass indicator, the algorithm 200" advances to step 210c. Conversely, when the location verification process (Lv) returns a fail indicator, the algorithm 200" advances to step 202, the packet is discarded and at step 203 ends the H-TEA scheme.

At step 210c the time verification process (Tv) is performed on the packet. An example of an algorithm to perform the time verification process (Tv) is described in FIG. 5. At step 220c when the time verification process (Tv) returns a pass indicator, the algorithm 200" advances to step 250. Conversely, when the time verification process (Tv) returns a fail indicator, the algorithm 200" advances to step 202, the packet is discarded and at step 203 ends the H-TEA scheme.

Figure 3:
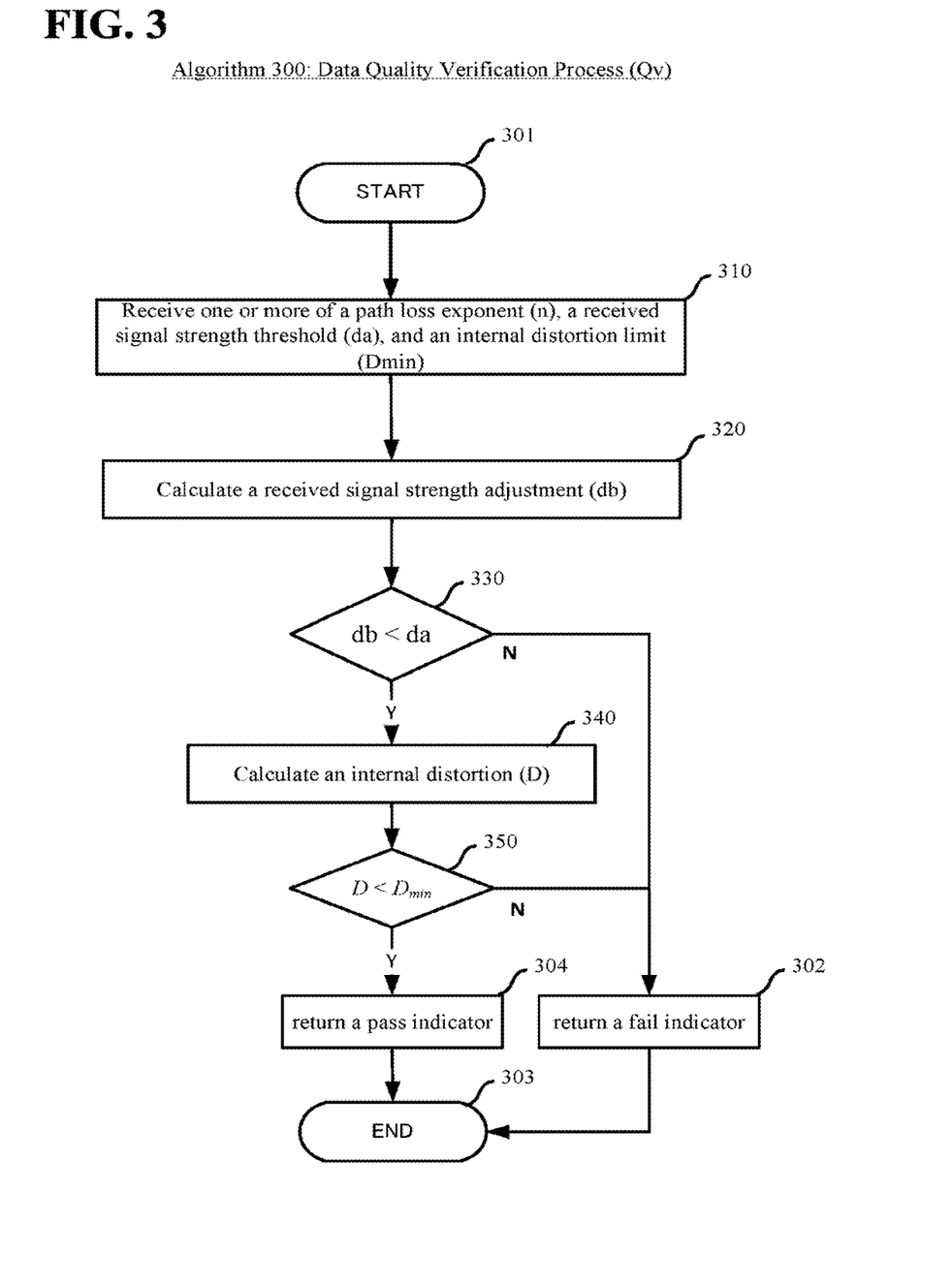
FIG. 3 shows a flowchart of an algorithm to perform a data quality verification process according to an example.

FIG. 3 shows a flowchart of an algorithm 300 to perform the data quality verification process (Qv) according to an example. The data quality verification process (Qv) can be done according to several scenarios. In an example, the data quality verification process (Qv) can be done according a series of steps described in the algorithm 300, which is based on a set of Qv factors. In an example the set of Qv factors include a set of system loss factors including an internal distortion (D), an external noise (N), a path loss exponent (n), a received signal strength (RSS), and a received signal strength threshold (da). In another example the data quality verification process (Qv) can require the packet to be transmitted within a time limit. The set of Qv factors can be already known to the receiving node or read from the packet.

The internal distortion (D) such as a quantization and an inter-signal interference can introduce an error in the packet. The path loss exponent (n) can be influenced by an external distortion such as a temperature condition, an environmental condition, a pollution condition, and can introduce an error in the packet. The path loss exponent (n) can also vary with an area type such as an urban area, a suburban area, and an open area.

At step 301 the data quality verification process (Qv) starts after being initiated. In an example the step 301 is initiated by the step 210 or the step 210a.

At step 310 a path loss exponent (n), a received signal strength threshold (da) or a RSS threshold (da), and an internal distortion limit (Dmin) are received. The internal distortion limit (Dmin) can depend on a hardware system or an internal system loss. A ratio of a transmitter power and a receiver power is proportional to square of a distance transmitted. Therefore, a practical value of Dmin can be the constant and can be determined as Eq. (1) below:

$$D_{min} = \frac{P_t}{d^2 P_r}$$

where Pt is the transmission power and Pr is the reception power.

At step 320 a received signal strength adjustment or a RSS adjustment (db) is calculated. The RSS adjustment (db) can be calculated according to several scenarios.

In an aspect, the RSS adjustment (db) can depend on a path loss of the signal energy, which is given by E in Eq. (2):

$$E = 10\log\left(\frac{Pt}{Pr}\right) = 10\log\left(\frac{Eb \cdot Rb(4\pi)^2 \cdot d0^2 \cdot D \cdot Ml \cdot N}{Gt \cdot Gr \cdot \lambda^2}\right)$$

where Eb is a required energy per bit for receiver, Rb is a bit rate, Gt is a transmitter antenna gain, Gr is a receiver antenna gain, λ is a wavelength, Ml is a link margin, and N is an external noise. In Eq. (2), d0 is a reference distance at which the path loss inherits a characteristic of a free-space loss and the external noise (N) can depend on the environmental condition.

In an aspect, the transmission power and/or the reception power can be based on the link quality, the path loss, and a distance (dsr) between the sender node 111 and the receiver node, as well as a packet reception rate (PRR), etc. In an example the distance (dsr) is a geographical distance d(Ls, Lr) that is calculated between the sender location (Ls) and the receiver location (Lr). Using Eq. (3), a signal power of a path loss (PL) can be calculated by subtracting a power loss due to the path loss exponent (n) from the path loss of the signal energy (E):

$$PL = E - 10n\log\left(\frac{dsr}{d0}\right)$$

The signal power of the path loss (PL) can be considered with a network topology 130 where a plurality of nodes 110 are used with a set of path loss exponents (n).

At step 330 the RSS adjustment (db) is compared to the RSS threshold (da). When the RSS adjustment (db) is less than the RSS threshold (da), the algorithm 300 will return a fail indicator 302 and at step 303 and end the data quality verification process (Qv) and return to step 220. When the RSS adjustment (db) is greater than or equal to the RSS threshold (da), the algorithm 300 will advance to step 340.

At step 340 the internal distortion (D) is calculated. The internal distortion (D) can be calculated according to Eq. 4:

$$D = \frac{G_t G_r \lambda^2 P_t}{(4\pi)^2 d_0^2 P_T}$$

In general, D>1. When D=1, there is no system loss. To achieve the best data quality, D<Dmin.

At step 350 the internal distortion (D) is compared to an internal distortion limit (Dmin). When the internal distortion (D) is less than the internal distortion limit (Dmin) the algorithm 300 will return a pass indicator 304 and at step 303 end the data quality verification process (Qv) and return to step 220 or step 220a. When the internal distortion (D) is greater or equal than the internal distortion limit (Dmin) the algorithm 300 will return a fail indicator 302 and at step 303 end the data quality verification process (Qv) and return to step 220 or step 220a.

Figure 4A:
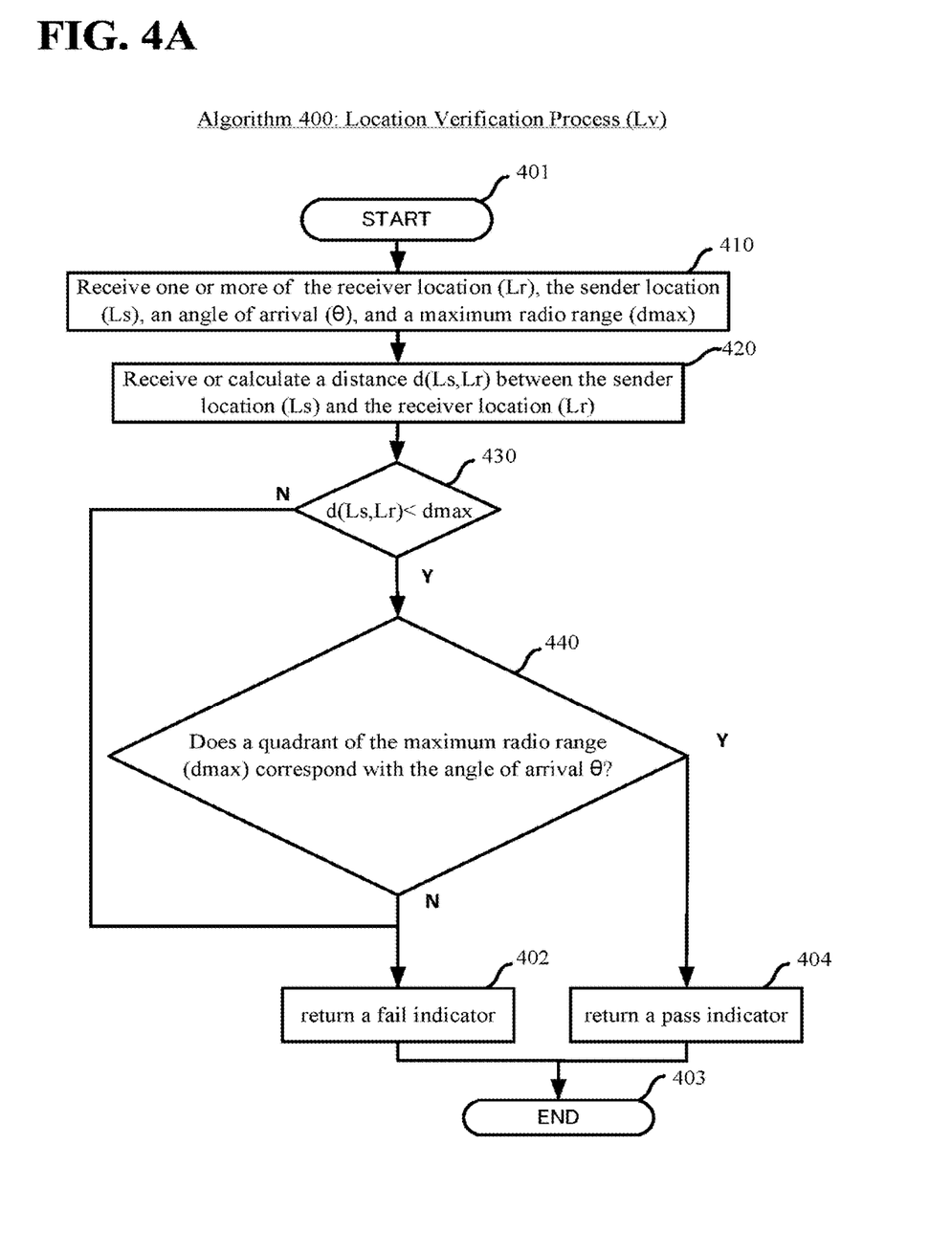
FIG. 4A shows a flowchart of an algorithm to perform a location verification process according to an example.

FIG. 4A shows a flowchart of an algorithm 400 to perform the location verification process (Lv) according to an example. The location verification process (Lv) can be configured to verify a relative position of the sender node 111 and thereby detect when a malicious node inserts a false location in the packet. According to one example, the location verification process (Lv) can based a set of Lv factors. The set of Lv factors can be already known to the receiving node or read from the packet. The set of Lv factors can include one or more of a spatial range such as the maximum radio range (dmax), a distance such as the distance (dsr) between the sender node 111 and the receiver node, and an geometrical angle such as the angle of arrival θ. In an aspect, the location verification process (Lv) can begin at the sender node 111 and therefore begins in a forward direction.

According to an example, the location verification process (Lv) can be divided into two phases. In a first phase, a determination is made to determine if the sender node 111 can reside within a maximum radio range (dmax) of the receiver node. The maximum radio range (dmax) can be a perimeter around the sender node 111. In a second phase, a determination can be made to determine if the sender node 111 is within a quadrant of the maximum radio range (dmax) that corresponds with the angle of arrival θ.

The location verification process (Lv) can be done according to a series of steps described by the algorithm 400, according to an example.

At step 401 the location verification process (Lv) starts after being initiated. In an example the step 401 is initiated by the step 210 or the step 210b.

At step 410 the receiver location (Lr), the sender location (Ls), the angle of arrival θ, and the maximum radio range (dmax) are received.

At step 420 a geographical distance d(Ls,Lr) is calculated between the sender location (Ls) and the receiver location (Lr) by using a standard Euclidean distance formula such as:

d(Ls, Lr)=√((Ls·x−Lr·x)²+(Ls·y−Lr·y)².

At step 430, when the geographical distance d(Ls,Lr) is greater or equal than the maximum radio range (dmax) of the sender node 111, the sender node 111 is considered to reside outside the maximum radio range (dmax) and the packet is considered to have a false location. Subsequently, the algorithm 400 will return a fail indicator 402 and at step 403 end the location verification process (Lv) and return to step 220 or step 220b. Conversely, when the geographical distance d(Ls,Lr) is less than the maximum radio range (dmax) of the sender node 111, the sender node 111 is considered to reside within the maximum radio range (dmax). Subsequently, the algorithm 400 will proceed to the second phase at step 440.

At step 440, the second phase of the location verification process (Lv) determines if the quadrant of the maximum radio range (dmax) corresponds with the angle of arrival θ.

When the angle of arrival θ corresponds with a respective quadrant of the maximum radio range (dmax), the packet is considered as having a relatively correct value for the sender location (Ls). Subsequently, the algorithm 400 will return a pass indicator 404 and at step 403 end the location verification process (Lv) and return to step 220 or step 220b. Conversely, when the angle of arrival θ does not correspond with a respective quadrant of the maximum radio range (dmax), the packet is considered as having a false value for the sender location (Ls) and the algorithm 400 will return a fail indicator 402 and at step 403 end the location verification process (Lv) and return to step 220 or step 220*b*.

Figure 4B:
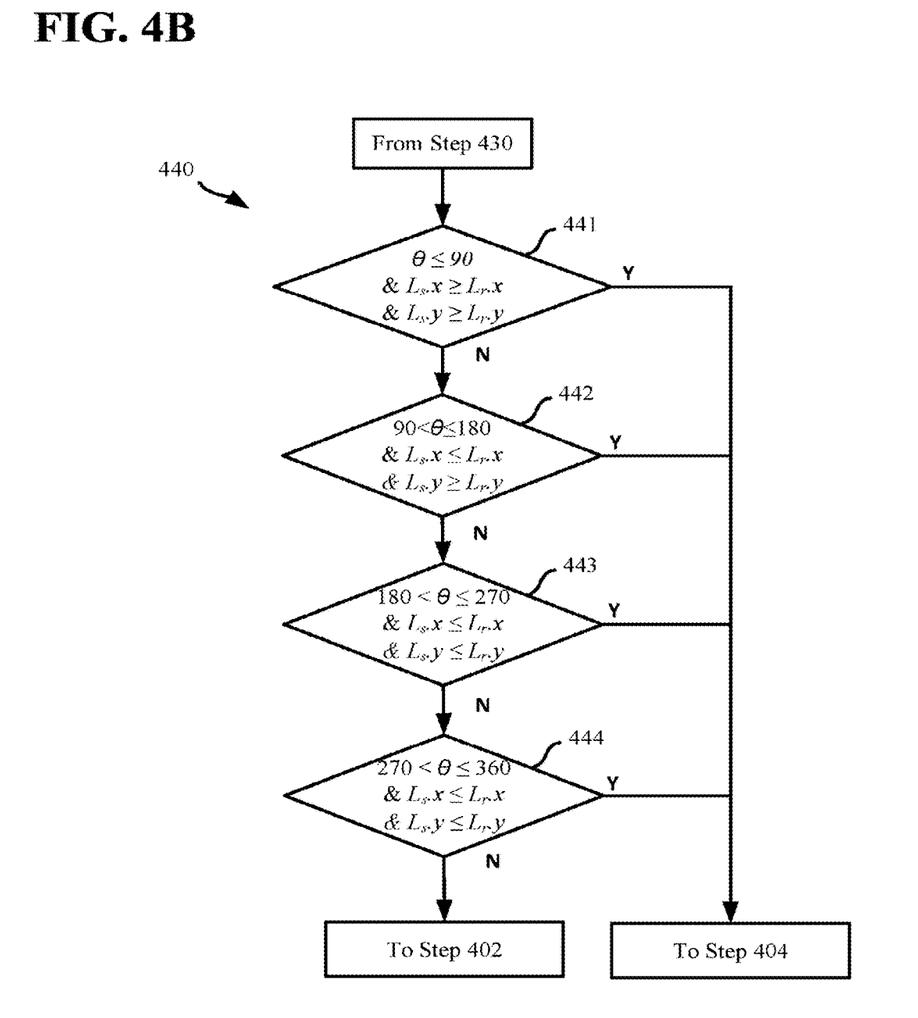
FIG. 4B shows a flowchart of a series of steps to perform a part of the location verification process according to an example.

FIG. 4B shows a flowchart of a series of steps to perform the step 440 according to an example. The step 440 can be done according to several scenarios. In one scenario the maximum radio range (dmax) is divided into four geographical quadrants or quadrants and a respective set of Cartesian coordinates that define a set of boundaries for each quadrant.

At step 441, when the angle of arrival θ≤90, a coordinate of the sender location (Ls) in a x-direction is greater than or equal to a coordinate of the receiver location (Lr) in the x-direction, and a coordinate of the sender location (Ls) in a y-direction is greater than or equal to a coordinate of the receiver location (Lr) in the y-direction, the sender location (Ls) is considered in the respective quadrant and the step 440 will return a pass indicator 404. Otherwise, the step 441 will advance to step 442.

At step 442, when the angle of arrival is 90≤θ≤180, a coordinate of the sender location (Ls) in a x-direction is less than or equal to a coordinate of the receiver location (Lr) in the x-direction, and a coordinate of the sender location (Ls) in a y-direction is greater than or equal to a coordinate of the receiver location (Lr) in the y-direction, the sender location (Ls) is considered in the respective quadrant and the step 440 will return a pass indicator 404. Otherwise, the step 442 will advance to step 443.

At step 443, when the angle of arrival is 180<θ≤270, a coordinate of the sender location (Ls) in a x-direction is less than or equal to a coordinate of the receiver location (Lr) in the x-direction, and a coordinate of the sender location (Ls) in a y-direction is less than or equal to a coordinate of the receiver location (Lr) in the y-direction, the sender location (Ls) is considered in the respective quadrant and the step 440 will return a pass indicator 404. Otherwise, the step 443 will advance to step 444.

At step 444, when the angle of arrival is 270<θ≤360, a coordinate of the sender location (Ls) in a x-direction is less than or equal to a coordinate of the receiver location (Lr) in the x-direction, and a coordinate of the sender location (Ls) in a y-direction is less than or equal to a coordinate of the receiver location (Lr) in the y-direction, the sender location (Ls) is considered in the respective quadrant and the step 440 will return a pass indicator 404. Otherwise, the step 440 will return a fail indicator 402.

In an example, the verification of the relative position of the sender node 111 is done to achieve simplicity and to reduce a computational cost. Other examples performing the location verification process (Lv) resulting in a greater precision may also be used. For example, each node can further include a sensor configured to measure a barometric pressure which can be used to compare an elevation at the geographic location.

Figure 5:
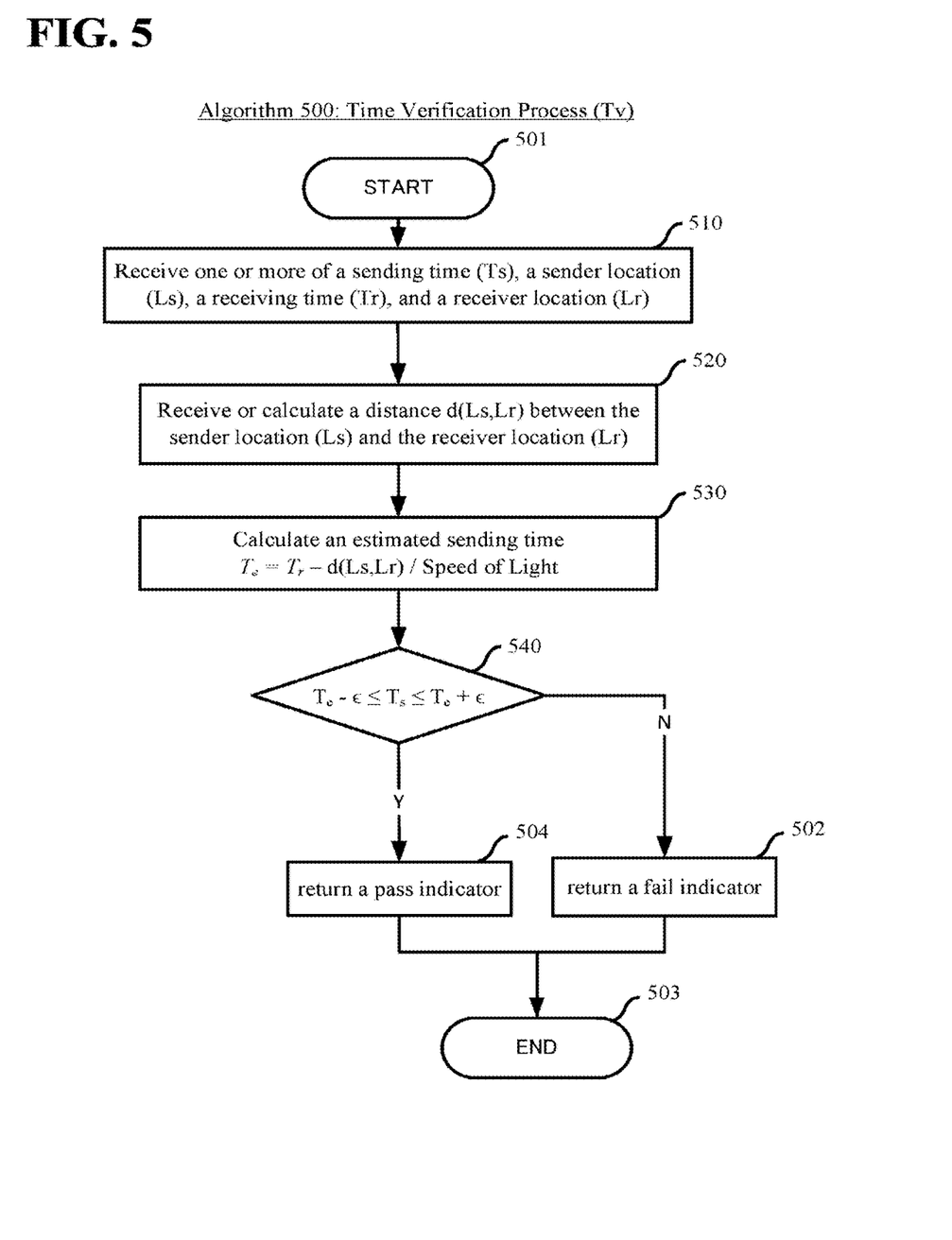
FIG. 5 shows a flowchart of an algorithm to perform a time verification process according to an example.

FIG. 5 shows a flowchart of an algorithm 500 to perform the time verification process (Tv) according to an example. The sending time (Ts) can primarily be used to provide protection against a replay attack. However, a malicious node can include a false sending time in the packet. Therefore, in order to ensure that the sender node 111 is trustful, a time verification process (Tv) can be performed.

According to one example, the time verification process (Tv) verifies a timeliness of the packet based on a set of Tv factors. The set of Tv factors can be already known to the receiving node or read from the packet. The set of Tv factors can include one or more of the receiving time (Tr), the sending time (Ts), the receiver location (Lr), and the sender location (Ls).

In an aspect the time verification process (Tv) can be divided into two parts. In a first part, an estimated sending time (Te) is calculated based on the geographical distance d(Ls,Lr), which is the distance between the sender location (Ls) and the receiver location (Lr). In a second part, the estimated sending time (Te) is compared to the receiving time (Tr). When the comparison is within a pre-specified threshold value, the time verification process (Tv) will return a pass indicator. Otherwise, when the comparison is not within the pre-specified threshold value, the time verification process (Tv) will return a fail indicator.

An example of the algorithm 500 performing the time verification process (Tv) is described as a series of steps here.

At step 501 the time verification process (Tv) starts after being initiated. In an example the step 501 is initiated by the step 210 or the step 210*c*.

At step 510 the receiving time (Tr), the sending time (Ts), the receiver location (Lr), and the sender location (Ls) are received from either the receiver node or the packet in an example. In another example the geographical distance d(Ls,Lr) is received from an earlier verification process, thus the receiver location (Lr) and the sender location (Ls) are not needed.

At step 520 the geographical distance d(Ls,Lr) is either received from an earlier process or calculated. In the example shown, the geographical distance d(Ls,Lr) is calculated using a standard Euclidean distance formula based on the sender location (Ls) and the receiver location (Lr).

At step 530 the estimated sending time (Te) is calculated. In an example shown, the estimated sending time (Te) can be calculated using a formula based on the geographical distance d(Ls,Lr) and a speed of light.

At step 540, when the sending time (Ts) and the estimated sending time (Te) are within a ±ε error threshold ε, the packet is considered to have a timestamp that is relatively correct. Subsequently, the algorithm 500 will return a pass indicator 504 and at step 503 end the time verification process (Tv) and return to step 220 or step 220*c*. Otherwise, when the sending time (Ts) and the estimated sending time (Te) are not within a ±ε error threshold ε, the packet is considered having a false timestamp. Subsequently, the algorithm 500 will return a fail indicator 502 and at step 503 end the time verification process (Tv) and return to step 220 or step 220*c*.

In an example, the error threshold ε can also be used to address a clock drift error in a clock used for the clock synchronization protocol of the network 100. In practice, a clock that is used for the clock synchronization protocol operates at a clock frequency, which can fluctuate over time due to any change in a temperature, a pressure, and a voltage. Therefore, the error threshold ε can depend or be based on the environmental condition. In an aspect, the error threshold ε can be set by a network administrator. Additionally, the error threshold can be configured to provide protection against a de-synchronization attack.

Figure 6:
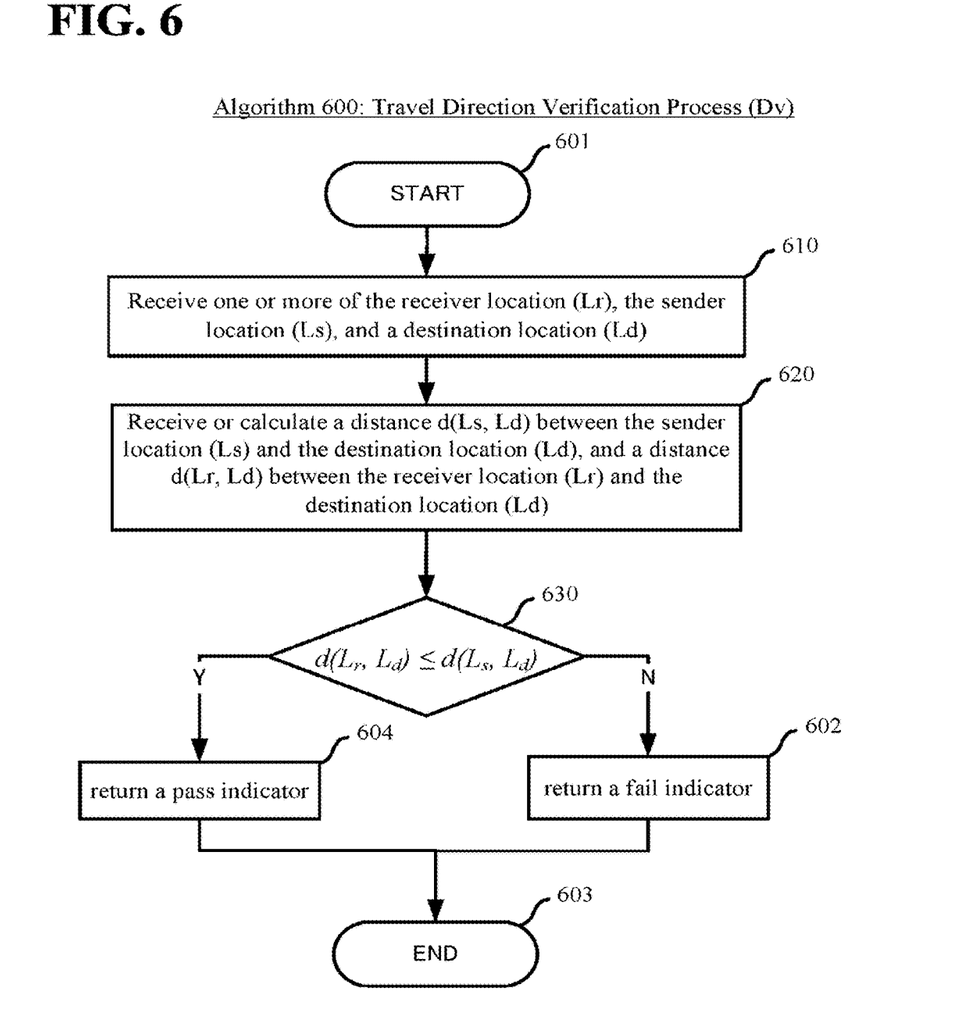
FIG. 6 shows a flowchart of an algorithm to perform a travel direction verification process according to an example.

FIG. 6 shows a flowchart of an algorithm 600 to perform the travel direction verification process (Dv) according to an example. According to one example, the travel direction verification process (Dv) verifies a travel direction of the packet based on a set of Dv factors. The set of Dv factors can be already known to the receiving node or read from the packet. The set of Dv factors can include one or more of the receiver location (Lr), the sender location (Ls), and a destination location (Ld). The algorithm 600 is described as a series of steps.

At step 601 the travel direction verification process (Dv) starts after being initiated. In an example the step 601 is initiated by the step 270.

At step 610 the receiver location (Lr), the sender location (Ls), and the destination location (Ld) are received from either the receiver node or the packet in an example.

At step 620 a distance d(Ls, Ld) between the sender location (Ls) and the destination location (Ld), and a distance d(Lr, Ld) between the receiver location (Lr) and the destination location (Ld) are determined by using a standard Euclidean distance formula such as: $d(Ls, Ld) = \sqrt{(Ls \cdot x - Ld \cdot x)^2 + (Ls \cdot y - Ld \cdot y)^2}$ and $d(Lr, Ld) = \sqrt{(Lr \cdot x - Ld \cdot x)^2 + (Lr \cdot y - Ld \cdot y)^2}$ respectfully.

At step 630 a comparison between the distance d(Ls, Ld) and the distance d(Lr, Ld) is done. When the distance d(Lr, Ld) is less than or equal to the distance d(Ls, Ld), the packet is considered to be traveling in a correct direction or towards the final destination. Subsequently, the algorithm 600 will return a pass indicator 604 and at step 603 end the travel direction verification process (Dv) and return to step 280. Conversely, when the distance d(Lr, Ld) is greater than the distance d(Ls, Ld), the packet is considered to be traveling in a false direction or away from the final destination. Subsequently, the algorithm 600 will return a fail indicator 602 and at step 603 end the travel direction verification process (Dv) and return to step 280.

Figure 7:
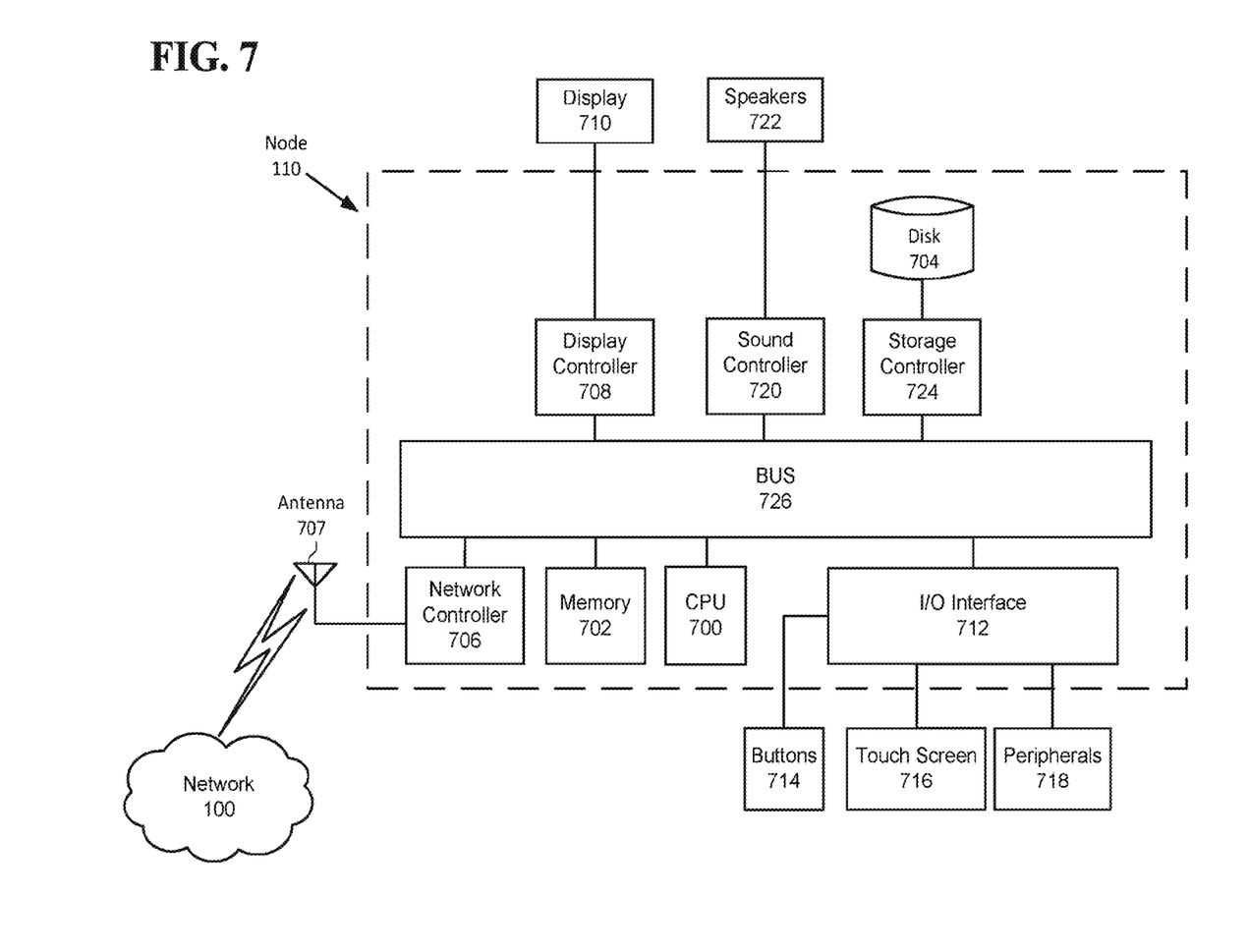
FIG. 7 is an exemplary block diagram of a node according to an example.

FIG. 7 is an exemplary block diagram of the node 110 according to one example that can be used for implementing the features described herein. In FIG. 7, the node 110 can include a communication bus 726 (BUS), which may be an ISA, EISA, VESA, PCI, or similar, for interconnecting all components of the node 110. The node 110 can include a CPU 700 that performs the processes described above as well as those described herein in this application in combination or alone. Data and processing instructions can be stored in a memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the node 110 communicates, such as a server or a computer.

Further, the claimed advancements may be provided as a utility application, background daemon, or component of an operating system, or combination thereof, executing in conjunction with the CPU 700 and an operating system such as Microsoft Windows 7, UNIX, Solaris, LINUX, Apple MAC-OS and other systems known to those skilled in the art.

The CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, the CPU 700 may be implemented as multiple processors cooperatively working in parallel to perform the instructions of the inventive processes described above.

The node 110 in FIG. 7 can include a network controller 706, such as an Intel Ethernet PRO network interface card from Intel Corporation of America, for interfacing with the network 100. The network controller 706 can be connected to one or more antenna 707 which are configured for transmitting and receiving the wireless signal. In an example, the one or more antenna 707 can be configured to be in an array and detect the angle of arrival A.

The node 110 further can include a display controller 708, such as a NVIDIA GeForce GTX or a Quadro graphics adaptor from NVIDIA Corporation of America for interfacing with a display 710. A general purpose I/O interface 712 can interface with one or more operation keys 714 and a touch screen panel 716 on or separate from the display 710. The I/O interface 712 can also connect to a variety of peripherals 718 including printers and scanners, such as an OfficeJet or DeskJet from Hewlett Packard. A sound controller 720 can also be provided in the node 110, such as Sound Blaster X-Fi Titanium from Creative, to interface with speakers/microphone 722 thereby providing sounds and/or music.

A general purpose storage controller 724 can also be provided in the node 110 and be configured to connect the storage medium disk 704 with the communication bus 726. A description of the general features and functionality of the display 710, the speakers, as well as the display controller 708, the storage controller 724, the network controller 706, the sound controller 720, and the general purpose I/O interface 712 is omitted herein for brevity as these features are known.

The exemplary circuit elements described in context of the present disclosure may be replaced with other elements and structured differently than the examples provided herein. Moreover, circuitry configured to perform features described herein may be implemented in multiple circuit units (e.g., chips), or the features may be combined in the circuitry on a single chipset. According to another example, the block diagram in FIG. 7 can be in part or in whole used to show the features of the network 100 that can be used for implementing the features described herein by the base station 120.

The H-TEA scheme can operate in the identity anonymous wireless sensor network environment and protect against a malicious attack on the network 100. In one example, the H-TEA scheme can protect against a malicious attack with directional flooding. The H-TEA scheme reduces a communication overhead and the energy consumption for the network 100. Accordingly, the present invention improves multiple technological fields including network data management, network communication, and network data security. The H-TEA scheme also enhances the functionality of the nodes themselves by having less computational overhead and energy consumption.

Obviously, numerous modifications and variations of the present invention are possible in light of the above teachings. It is therefore to be understood that within the scope of the appended claims, the invention may be practiced otherwise than as specifically described herein.

The invention claimed is:

1. A system for routing a data packet, the system comprising:
   a network having a plurality of nodes and at least one base station,
   where at least one node includes circuitry configured to
     receive a data packet;
     perform a data quality verification of the data packet;
     perform a location verification of the data packet;

perform a time verification of the data packet;
evaluate a trustworthiness of the data packet based on at least one of the data quality verification, the location verification, and the time verification; and
route the data packet to at least one of another node or a base station in the network based on the evaluating,
wherein the data quality verification is based on comparing a received signal strength adjustment with a received signal strength threshold and
comparing an internal distortion with an internal distortion limit.

2. The system for routing a data packet according to claim 1, wherein the location verification is based on a receiver location, a sender location, an angle of arrival, and a maximum radio range.

3. The system for routing a data packet according to claim 1, wherein the time verification is based on a receiving time associated with the data packet.

4. The system for routing a data packet according to claim 1, wherein the circuitry is further configured to
determine whether the node is a destination node;
perform, in response to the at least one node not being the destination node, a travel direction verification of the data packet; and
evaluate a trustworthiness of the data packet based on the travel direction verification.

5. The system for routing a data packet according to claim 4, wherein the travel direction verification is based on a receiver location, a sender location, and a destination location.

6. The system for routing a data packet according to claim 4, wherein the determining of whether the node is a destination node is based on a destination location.

7. The system for routing a data packet according to claim 1, wherein the at least one node has a transmission power and a reception power,
and wherein the internal distortion limit is a value proportional to a ratio of the transmission power and the reception power, and is inversely proportional to a square of a distance transmitted.

8. The system for routing a data packet according to claim 1, wherein the circuitry is configured to evaluate the trustworthiness based on the data quality verification, the location verification, and the time verification.

9. The system for routing a data packet according to claim 1, wherein the circuitry is configured to perform the data quality verification before the location verification, and is configured to perform the location verification before the time verification.

10. A method for routing a data packet, the method comprising:
receiving, at a node, a data packet;
performing, via a processing circuitry, a data quality verification of the data packet;
performing, via the processing circuitry, a location verification of the data packet;
performing, via the processing circuitry, a time verification of the data packet;
evaluating, via the processing circuitry, a trustworthiness of the data packet based on at least one of the data quality verification, the location verification, and the time verification; and
routing the data packet based on the evaluating,
wherein the data quality verification is based on comparing a received signal strength adjustment with a received signal strength threshold and
comparing an internal distortion with an internal distortion limit.

11. The method for routing a data packet according to claim 10, wherein the location verification is based on an angle of arrival associated with the data packet.

12. The method for routing a data packet according to claim 10, wherein the time verification is based on a receiving time associated with the data packet.

13. The method for routing a data packet according to claim 10, the method further comprising:
determining whether the node is a destination node;
performing, via the processing circuitry and in response to the node not being a destination node, a travel direction verification of the data packet; and
evaluating a trustworthiness of the data packet based on the travel direction verification.

14. The method for routing a data packet according to claim 13, wherein the determining of whether the node is a destination node is based on a destination location associated with the data packet.

15. A node for routing a data packet in a network, the node comprising:
circuitry configured to
receive a data packet;
perform a data quality verification of the data packet;
perform a location verification of the data packet;
perform a time verification of the data packet;
evaluate a trustworthiness of the data packet based on at least one of the data quality verification, the location verification, and the time verification; and
route the data packet to at least one other node in the network based on the evaluating,
wherein the data quality verification is based on comparing a received signal strength adjustment with a received signal strength threshold and
comparing an internal distortion with an internal distortion limit.

16. The node for routing a data packet in a network according to claim 15, wherein the location verification is based on a receiver location, a sender location, a maximum radio range and an angle of arrival associated with the data packet.

17. The node for routing a data packet in a network according to claim 15, wherein the time verification is based on a receiving time associated with the data packet.

18. The node for routing a data packet in a network according to claim 15, wherein the circuitry is further configured to
determine whether the node is a destination node;
perform, in response to the at least one node not being the destination node, a travel direction verification of the data packet; and
evaluate a trustworthiness of the data packet based on the travel direction verification.

19. The node for routing a data packet in a network according to claim 18, wherein the travel direction verification is based on a receiver location, a sender location, and a destination location.

20. The node for routing a data packet in a network according to claim 18, wherein the determining of whether the node is a destination node is based on a destination location associated with the data packet.

* * * * *